United States Patent
Liu et al.

(10) Patent No.: US 6,826,300 B2
(45) Date of Patent: Nov. 30, 2004

(54) FEATURE BASED CLASSIFICATION

(75) Inventors: Chengjun Liu, West Orange, NJ (US);
Harry Wechsler, Fairfax, VA (US)

(73) Assignee: George Mason University, Fairfax, VA (US)

( * ) Notice: Subject to any disclaimer, the term of this patent is extended or adjusted under 35 U.S.C. 154(b) by 316 days.

(21) Appl. No.: 10/158,591

(22) Filed: May 31, 2002

(65) Prior Publication Data

US 2003/0086593 A1 May 8, 2003

Related U.S. Application Data

(60) Provisional application No. 60/294,262, filed on May 31, 2001.

(51) Int. Cl.[7] .................................................. G06K 9/00
(52) U.S. Cl. ....................................... 382/159; 382/118
(58) Field of Search ................. 382/115–119, 155–161, 382/191, 302; 700/47, 48

(56) References Cited

U.S. PATENT DOCUMENTS 6,219,640 B1 * 4/2001 Basu et al. .................. 704/246
6,222,939 B1 * 4/2001 Wiskott et al. .............. 382/209
6,775,415 B1 * 8/2004 Clausen et al. .............. 382/249

OTHER PUBLICATIONS

A Gabor feature classifier for face recognition, by Liu et al., IEEE 2001, pp. 270–275.*

Gabor feature based classification using the enhanced fisher linear discriminant model for face reacognition, by Liu et al., IEEE 2002, pp. 467–476.*

Gabor based kernel PCA with fractional power polynomial models for face recognition, by Liu, IEEE 2004, pp. 572–581.*

* cited by examiner

*Primary Examiner*—Vikkram Bali
(74) *Attorney, Agent, or Firm*—David G. Grossman

(57) ABSTRACT

A method and system for determining the similarity between an image and at least one training sample is disclosed. This invention is a novel Gabor Feature Classifier (GFC), a principal application of which may be for face recognition. The GFC applies the Enhanced FLD Model (EFM) to an augmented Gabor feature vector derived from the Gabor wavelet transformation of images.

32 Claims, 13 Drawing Sheets

FEATURE BASED CLASSIFICATION

CROSS-REFERENCE TO RELATED APPLICATIONS

This present application claims the benefit of provisional patent application Ser. No. 60/294,262 to Wechsler et al., filed on May 31, 2001, entitled "Gabor Feature Based Classification Using Enhanced Fisher Linear Discriminate Model for Face Recognition," which is hereby incorporated by reference.

BACKGROUND OF THE INVENTION

The present invention relates to field of face recognition systems. More specifically, the present invention utilizes a novel Gabor Feature Classifier for face recognition.

Understanding how people process and recognize each other's face, and the development of corresponding computational models for automated face recognition are among the most challenging tasks for visual form ('shape') analysis and object recognition. The enormity of the problem has involved hundreds of scientists in interdisciplinary research, but the ultimate solution is yet to come.

Face recognition is largely motivated by the need for surveillance and security, telecommunication and digital libraries, human-computer intelligent interaction, and smart environments. Some of these security uses may include log in control and physical access control. Further applications may include: law enforcement uses such as mug shot albums, and criminology; and commercial transaction which use credit cards, driver's licenses, passports, or other photo ID identifications. Virtually all applications that depend upon the identification of a person could benefit from this technology.

The solutions suggested so far are synergetic efforts from fields such as signal and image processing, pattern recognition, machine learning, neural networks, statistics, evolutionary computation, psychophysics of human perception and neurosciences, and system engineering. A generic approach often used involves statistical estimation and learning of face class statistics for subsequent face detection and classification. Face detection generally applies a statistical characterization of faces and non-faces to build a classifier, which may then used to search over different locations and scales for image patterns that are likely to be human faces.

Face recognition usually employs various statistical techniques to derive appearance-based models for classification. Some of these techniques include but are not limited to: principal component analysis (hereinafter referred to as PCA); Fisher linear discriminant (hereinafter referred to as FLD) which are also known as linear discriminant analysis (hereinafter referred to as LDA); independent component analysis (hereinafter referred to as ICA); local feature analysis (hereinafter referred to as LFA); and Gabor and bunch graphs. Descriptions of PCA may be found in: [M. Turk and A. Pentland, "Eigenfaces for recognition," Journal of Cognitive Neuroscience, vol. 13, no. 1, pp. 71–86, 1991], and [B. Moghaddam and A. Pentland, "Probabilistic visual learning for object representation," IEEE Trans. Pattern Analysis and Machine Intelligence, vol. 19, no. 7, pp. 696–710, 1997]. Descriptions of FLD and LDA may be found in: [D. L. Swets and J. Weng, "Using discriminant eigenfeatures for image retrieval," IEEE Trans. Pattern Analysis and Machine Intelligence, vol. 18, no. 8, pp. 831–836, 1996.]; [P. N. Belhumeur, J. P. Hespanha, and D. J. Kriegman, "Eigenfaces vs. Fisherfaces: Recognition using class specific linear projection," IEEE Trans. Pattern Analysis and Machine Intelligence, vol. 19, no. 7, pp. 711–720, 1997.], and [K. Etemad and R. Chellappa, "Discriminant analysis for recognition of human face images," J. Opt. Soc. Am. A, vol. 14, pp. 1724–1733, 1997]. A description of ICA may be found in: [G. Donato, M. S. Bartlett, J. C. Hager, P. Ekman, and T. J. Sejnowski, "Classifying facial actions," IEEE Trans. Pattern Analysis and Machine Intelligence, vol. 21, no. 10, pp. 974–989, 1999]. LFA is described in [P. S. Penev and J. J. Atick, "Local feature analysis: A general statistical theory for object representation," Network: Computation in Neural Systems, vol. 7, pp. 477–500, 1996]. A description of Gabor and bunch graphs may be found in [L. Wiskott, J. M. Fellous, N. Kruger, and C. von der Malsburg, "Face recognition by elastic bunch graph matching," IEEE Trans. Pattern Analysis and Machine Intelligence, vol. 19, no. 7, pp. 775–779, 1997].

Face recognition may depend heavily on the particular choice of features used by the classifier. One usually starts with a given set of features and then attempts to derive an optimal subset (under some criteria) of features leading to high classification performance with the expectation that similar performance may be also displayed on future trials using novel (unseen) test data. PCA is a popular technique used to derive a starting set of features for both face representation and recognition. Kirby and Sirovich showed that any particular face may be (i) economically represented along the eigenpictures coordinate space, and (ii) approximately reconstructed using just a small collection of eigenpictures and their corresponding projections ('coefficients'). [M. Kirby and L. Sirovich, "Application of the Karhunen-Loeve procedure for the characterization of human faces," IEEE Trans. Pattern Analysis and Machine Intelligence, vol. 12, no. 1, pp. 103–108, 1990].

Applying PCA technique to face recognition, Turk and Pentland developed a well-known Eigenfaces method that sparked an explosion of interests in applying statistical techniques to face recognition. [M. Turk and A. Pentland, "Eigenfaces for recognition," Journal of Cognitive Neuroscience, vol. 13, no. 1, pp. 71–86, 1991]. PCA, an optimal representation criterion (in the sense of mean square error), does not consider the classification aspect. One solution for taking into account and improving the classification performance is to combine PCA, the optimal representation criterion, with the Bayes classifier, the optimal classification criterion (when the density functions are given). Toward that end, Moghaddam and Pentland developed a probabilistic visual learning method, which uses the eigenspace decomposition as an integral part of estimating complete density functions in high-dimensional image space. [B. Moghaddam and A. Pentland, "Probabilistic visual learning for object representation," IEEE Trans. Pattern Analysis and Machine Intelligence, vol. 19, no. 7, pp. 696–710, 1997]. While the leading eigenvalues are derived directly by PCA, the remainder of the eigenvalue spectrum is estimated by curve fitting.

Rather than estimating the densities in high-dimensional space, Liu and Wechsler developed a PRM (Probabilistic Reasoning Models) method by first applying PCA for dimensionality reduction and then applying the Bayes classifier and the MAP rule for classification. [C. Liu and H. Wechsler, "Robust coding schemes for indexing and retrieval from large face databases," IEEE Trans. on Image Processing, vol. 9, no. 1, pp. 132–137, 2000]. The rationale of the PRM method is that of lowering the space dimension subject to increased fitness for the discrimination index by estimating the conditional density function of each class using the within-class scatter in the reduced PCA space.

Another important statistical technique widely used in face recognition is the FLD, which models both the within- and the between-class scatters. FLD, which is behind several face recognition methods, induces non-orthogonal projection bases, a characteristic known to have great functional significance in biological sensory systems [J. G. Daugman, "An information-theoretic view of analog representation in striate cortex," in Computational Neuroscience, E. L. Schwartz, Ed., pp. 403–424. MIT Press, 1990]. As the original image space is highly dimensional, most face recognition methods perform first dimensionality reduction using PCA, as it is the case with the Fisherfaces method suggested by Belhumeur, Hespanha, and Kriegman [P. N. Belhumeur, J. P. Hespanha, and D. J. Kriegman, "Eigenfaces vs. Fisherfaces: Recognition using class specific linear projection," IEEE Trans. Pattern Analysis and Machine Intelligence, vol. 19, no. 7, pp. 711–720, 1997]. Swets and Weng have pointed out that the Eigenfaces method derives only the Most Expressive Features (MEF) and that PCA inspired features do not necessarily provide for good discrimination. As a consequence, the subsequent FLD projections are used to build the Most Discriminating Features (MDF) classification space. [D. L. Swets and J. Weng, "Using discriminant eigenfeatures for image retrieval," IEEE Trans. Pattern Analysis and Machine Intelligence, vol. 18, no. 8, pp. 831–836, 1996.] The MDF space is, however, superior to the MEF space for face recognition only when the training images are representative of the range of face (class) variations; otherwise, the performance difference between the MEF and MDF is not significant. The drawback of FLD is that it requires large sample sizes for good generalization. For a face recognition problem, however, usually there are a large number of faces (classes), but only a few training examples per face. One possible remedy for this drawback is to artificially generate additional data and thus increase the sample size [K. Etemad and R. Chellappa, "Discriminant analysis for recognition of human face images," J. Opt. Soc. Am. A, vol. 14, pp. 1724–1733, 1997]. Yet another remedy is to improves FLD's generalization performance by balancing the need for adequate signal representation and subsequent classification performance using sensitivity analysis on the spectral range of the within-class eigenvalues [C. Liu and H. Wechsler, "Robust coding schemes for indexing and retrieval from large face databases," IEEE Trans. on Image Processing, vol. 9, no. 1, pp. 132–137, 2000].

Other developments, which are conceptually relevant to the face recognition community in general, and to this paper in particular, include the Local Feature Analysis (hereinafter referred to as LFA) method due to Penev and Atick [P. S. Penev and J. J. Atick, "Local feature analysis: A general statistical theory for object representation," Network: Computation in Neural Systems, vol. 7, pp. 477–500, 1996] and the related Dynamic Link Architecture (hereinafter referred to as DLA) [M. Lades, J. C. Vorbruggen, J. Buhmann, J. Lange, C. von der Malsburg, Wurtz R. P., and W. Konen, "Distortion invariant object recognition in the dynamic link architecture," IEEE Trans. Computers, vol. 42, pp. 300–311, 1993] and elastic graph matching methods. [L. Wiskott, J. M. Fellous, N. Kruger, and C. von der Malsburg, "Face recognition by elastic bunch graph matching," IEEE Trans. Pattern Analysis and Machine Intelligence, vol. 19, no. 7, pp. 775–779, 1997] LFA uses a sparse version of the PCA transform, followed by a discriminative network. The DLA starts by computing the Gabor jets, and then it performs a flexible template comparison between the resulting image decompositions using graph-matching.

A method of face recognition that used Gabor filters and Fisher Linear Discriminants is disclosed in U.S. Pat. No. 6,219,640 to Basu et al., entitled "Methods and Apparatus for Audio-Visual Speaker recognition and utterance verification." The '640 patent uses Gabor filters to find features, such as large-scale features (eyes, nose, and mouth) and 29 sub-features (hairline, chin, ears, . . . ). Gabor Jet representations are generated at estimated sub-feature locations. The representations use complex coefficients encompassing thousands of complex numbers. Image Processing as described in the '640 patent, where features (such as eyes, nose, hairline, chin . . . ) are detected is time-consuming and not robust because of it's heavy computational cost and the unreliable results. What is needed is a full facial Gabor wavelet transformation where no feature detection is involved.

The '640 patent also discloses the application of Fisher Linear Discriminants to detect facial features. The FLD is applied as a binary classifier for feature detection rather than for face recognition. It is well-known that FLD does not generalize gracefully. (see ref. [10]: Donato et al. "Classifying Facial Actions", IEEE Trans. Pattern Analysis and Machine Intelligence, vol 21(10), 1999). A system with an improved FLD generalization ability would overcome this patents generalization properties.

What is needed is a face recognition system wherein an image may be matched against sample images efficiently and economically. This system will preferably have a highly generalized ability and not require any discrete feature matching.

BRIEF SUMMARY OF THE INVENTION

One advantage of the present invention is that it is that it derives statistical features from a whole image, hence there is no need for facial feature point detection.

Another advantage of this invention is that it is that it derives an augmented Gabor feature vector, whose dimensionality may be further reduced using the EFM by considering both data compression and recognition (generalization) performance.

Another advantage of this invention is that its derived Gabor wavelet utilizes a new normalization procedure and an enhanced LDA that is optimal for both representation and recognition purposes.

A further advantage of this invention is that it integrates Gabor and EFM, which considers not only data compression, recognition accuracy, but also generalization performance.

To achieve the foregoing and other advantages, in accordance with all of the invention as embodied and broadly described herein, a method for determining similarity between an image and at least one training sample, comprising the steps of: iteratively for the image and each of the training sample(s): generating a preprocessed image; calculating an augmented Gabor feature vector from the preprocessed image; deriving a lower dimensional feature vector from the augmented Gabor feature vector; processing the lower dimensional feature vector with a lower dimensional feature space discriminator; deriving an overall transformation matrix from the lower dimensional feature vector and the lower dimensional feature space discriminator; and calculating an image feature vector; and determining a similarity measure for the image and the at least one training sample.

In yet a further aspect of the invention, a system for determining similarity between an image and at least one training sample. The image may be preprocessed by an image preprocessor capable of generating a preprocessed image from the image. An augmented Gabor feature vector calculator may then generate a augmented Gabor feature vector from the preprocessed image. Next, a lower dimensional feature vector deriver may derive a lower dimensional feature vector from the augmented Gabor feature vector. A lower dimensional feature space processor may then create a discriminated lower dimensional feature space vector by process the lower dimensional feature vector with a lower dimensional feature space discriminator. An overall transformation matrix deriver may then derive an overall transformation matrix from the discriminated lower dimensional feature vector. An image feature vector calculator may then calculate an image feature vector using the overall transformation matrix, and a similarity measure calculator then preferably determines a similarity measure for the image and the at least one training sample.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention utilizes an Enhanced Fisher Linear Discriminant (FLD), called EFM, as a multi-class recognizer, which considers both data reduction and generalization improvement. As a result, the present invention derives low-dimensional features with enhanced recognition performance. This Enhanced FLD may be used in the present invention as a face recognizer.

Gabor wavelets may preferably be used for image analysis because of their biological relevance and computational properties. The Gabor wavelets, whose kernels are similar to the 2D receptive field profiles of the mammalian cortical simple cells, exhibit strong characteristics of spatial locality and orientation selectivity, and are optimally localized in the space and frequency domains.

The Gabor wavelets (kernels, filters) may be defined as follows:

$$\psi_{u,v}(z) = \frac{\|k_{u,v}\|^2}{\sigma^2} e^{-\frac{\|k_{u,v}\|^2 \|z\|^2}{2\sigma^2}} \left[ e^{ik_{u,v}z} - e^{-\frac{\sigma^2}{2}} \right] \quad (1)$$

where u and v define the orientation and scale of the Gabor kernels, $z=(x,y)$, $\|\cdot\|$ denotes the norm operator, and the wave vector $k_{u,v}$ may be defined as follows:

$$k_{u,v}=k_v e^{i\phi_u} \quad (2)$$

where $k_v=k_{max}/f^v$ and $\phi_u=\pi u/8$. f is the spacing factor between kernels in the frequency domain.

The set of Gabor kernels in Eq. 1 may all be self-similar since they may be generated from one filter, the mother wavelet, by scaling and rotation via the wave vector $k_{u,v}$. Each kernel may be a product of a Gaussian envelope and a complex plane wave, while the first term in the square brackets in Eq. 1 preferably determines the oscillatory part of the kernel and the second term preferably compensates for the DC value. The effect of the DC term may become negligible when the parameter σ, which determines the ratio of the Gaussian window width to wavelength, has sufficiently high values.

Figure 1:
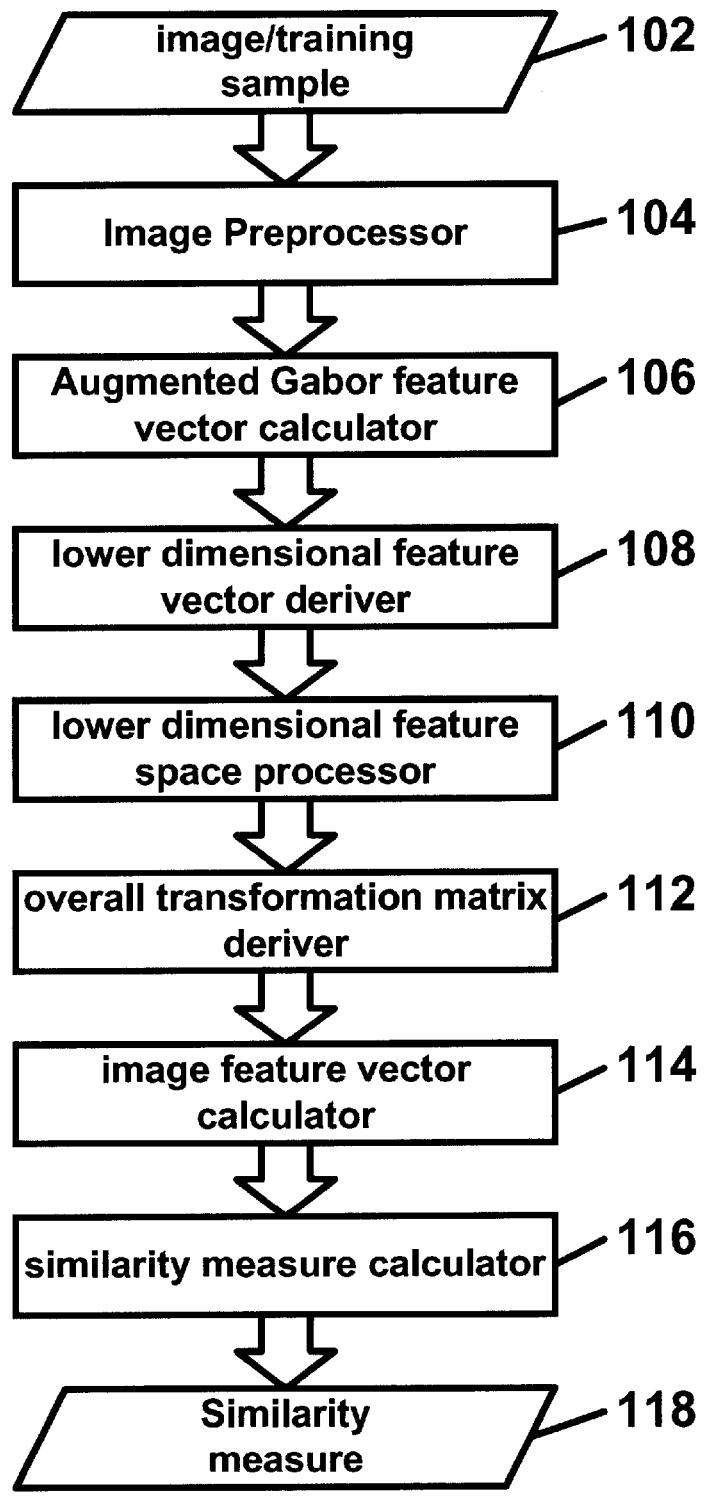
FIG. 1 is a block diagram showing a system for determining similarity between an image and at least one training sample as per an embodiment of the present invention.

In most cases one would be using Gabor wavelets of five different scales, $v \in \{0, \ldots, 4\}$, and eight orientations, $u \in \{0, \ldots, 7\}$. FIG. 1 shows the real part of the Gabor kernels at five scales and eight orientations and their magnitudes, with the following parameters: $\sigma=2\pi$, and $f=\sqrt{2}$. The kernels appear to exhibit strong characteristics of spatial locality and orientation selectivity, making them a suitable choice for image feature extraction when one's goal is to derive local and discriminating features for (face) classification.

Gabor wavelet transformation of an image may be the convolution of the image with a family of Gabor kernels as defined by Eq. 1. Let I(x,y) be the gray level distribution of an image, the convolution output of image I and a Gabor kernel $\psi_{u,v}$ may be defined as follows:

$$O_{u,v}(z)=I(z)*\psi_{u,v}(z) \quad (3)$$

where $z=(x,y)$ and * denotes the convolution operator.

Applying the convolution theorem, the convolution output may be derived from Eq. 3 via the Fast Fourier Transform (FFT):

$$\Im\{O_{u,v}(z)\}=\Im\{I(z)\}\Im\{\psi_{u,v}(z)\} \quad (4)$$

and $$O_{u,v}(z)=\Im^{-1}\{\Im\{I(z)\}\Im\{\psi_{u,v}(z)\}\} \quad (5)$$

where $\Im$ and $\Im^{-1}$ denote the Fourier and inverse Fourier transforms, respectively.

The convolution outputs (the real part and the magnitude) of a sample image and Gabor kernels have exhibited strong characteristics of spatial locality, scale and orientation selectivity. Such characteristics produced salient local features, such as the eyes, nose and mouth, that are suitable for visual event recognition. Since the output $O_{u,v}(z)$ consists of different local, scale and orientation features, all those features may be concatenated together in order to derive an augmented feature vector X. Without loss of generality, each output $O_{u,v}(z)$ may be assumed to also be a vector, which may be constructed by concatenating the rows (or columns) of the output. Before the concatenation, each output $O_{u,v}(z)$ may first be down-sampled by a factor $\rho$ to reduce the dimensionality of the original vector space, and then each vector may be normalized to have zero mean and unit variance. Let $O_{u,v}^{(\rho)}$ denote a normalized output (down-sampled by $\rho$ and normalized to zero mean and unit variance), then the augmented feature vector $X^{(\rho)}$ may be defined as follows:

$$X^{(\rho)}=(O_{0,0}^{(\rho)t} O_{0,1}^{(\rho)t} \ldots O_{4,7}^{(\rho)t})^t \quad (6)$$

where t is the transpose operator. The augmented feature vector may thus encompass all the outputs, $O_{u,v}(z)$, $u \in \{0, \ldots, 7\}$, $v \in \{0, \ldots, 4\}$, as important discriminating information.

Next, the novel Gabor Feature based Classification (GFC) method which applies the Enhanced FLD (Fisher Linear Discriminant) Model (EFM) on the derived augmented Gabor feature vector $X^{(\rho)}$ is disclosed. The dimensionality of the resulting vector space may be reduced, using the eigenvalue selectivity constraint of the EFM method, in order to derive a low-dimensional feature representation with enhanced discrimination power.

The derived augmented Gabor feature vector resides in a space of very high dimensionality: $\chi^{(\rho)} \in \mathbb{R}^N$, where N is the dimensionality of the vector space. Psychophysical findings indicate, however, that "perceptual tasks such as similarity judgment tend to be performed on a low-dimensional representation of the sensory data. Low dimensionality is especially important for learning, as the number of examples required for attaining a given level of performance grows exponentially with the dimensionality of the underlying representation space." [S. Edelman, Representation and Recognition in Vision, MIT Press, 1999]. Low-dimensional representations may also be important when one considers the intrinsic computational aspect. Principal Component Analysis (PCA) may be a method of choice when the primary goal is to project the similarity judgment for face recognition into a low dimensional space.

PCA is a standard decorrelation technique. Following PCA's application, one may derive an orthogonal projection basis that directly leads to dimensionality reduction, and possibly to feature selection. Let $\Sigma_{X^{(\rho)}} \in \mathbb{R}^{N \times N}$ define the covariance matrix of the augmented feature vector $X^{(\rho)}$:

$$\Sigma_{X^{(\rho)}}=\epsilon\{[X^{(\rho)}-\epsilon(X^{(\rho)})][X^{(\rho)}-\epsilon(X^{(\rho)})]^t\} \quad (7)$$

where $\epsilon(\cdot)$ is the expectation operator. The PCA of a random vector $X^{(\rho)}$ factorizes the covariance matrix $\Sigma_{X^{(\rho)}}$ into the following form:

$$\Sigma_{X^{(\rho)}}=\Phi\Lambda\Phi^t \text{ with } \Phi=[\phi_1 \phi_2 \ldots \phi_N], \Lambda=\text{diag}\{\lambda_1 \lambda_1, \ldots \lambda_N\} \quad (8)$$

where $\Phi \in \mathbb{R}^{N \times N}$ is an orthonormal eigenvector matrix and $\Lambda \in \mathbb{R}^{N \times N}$ a diagonal eigenvalue matrix with diagonal elements in decreasing order $(\lambda_1 \geq \lambda_2 \ldots \geq \lambda_N)$.

An important property of PCA is its optimal signal reconstruction in the sense of minimum Mean Square Error (MSE) when only a subset of principal components is used to represent the original signal. Following this property, an immediate application of PCA may be dimensionality reduction:

$$y^{(\rho)}=P^t X^{(\rho)} \quad (9)$$

where $P=[\phi_1 \phi_2 \ldots \phi_m]$, $m<N$ and $P \in \mathbb{R}^{N \times m}$. The lower dimensional vector $y^{(\rho)} \in \mathbb{R}^m$ preferably captures the most expressive features of the original data $X^{(\rho)}$.

However, one should be aware that the PCA driven coding schemes may be optimal and useful only with respect to data compression and decorrelation of low (second) order statistics. PCA may not take into account the recognition (discrimination) aspect and one should thus not expect optimal performance for tasks such as face recognition when using such PCA-like based encoding schemes. To address this obvious shortcoming, one may reformulate the original problem as one where the search is still for low-dimensional patterns but is now also subject to seeking a high discrimination index, characteristic of separable low-dimensional patterns. One solution to solve this new problem is to use the Fisher Linear Discriminant (FLD) for the very purpose of achieving high separability between the different patterns in whose classification one is interested. Characteristic of this approach are recent schemes such as the Most Discriminating Features (MDF) and the Fisherfaces. FLD is a popular discriminant criterion which measures the between-class scatter normalized by the within-class scatter. Let $\omega_1, \omega_2, \ldots, \omega_L$ and $N_1, N_2, \ldots, N_L$ denote the classes and the number of images within each class, respectively. Let $M_1, M_2, \ldots, M_L$ and M be the means of the classes and the grand mean. The within- and between-class covariance matrices $\Sigma_\omega$ and $\Sigma_b$ may be defined as follows:

$$\sum_\omega = \sum_{i=1}^{L} P(\omega_i) \varepsilon\{(y^{\rho}-M_i)(y^{(\rho)}-M_i)^t \mid \omega_i\} \quad (10)$$

and $$\sum_b = \sum_{i=1}^{L} P(\omega_i)(M_i-M)(M_i-M)^t s \quad (11)$$

where $P(\omega_i)$ is a priori probability, $\Sigma_\omega, \Sigma_b \in \mathbb{R}^{m \times m}$, and L denotes the number of classes. FLD derives a projection matrix $\Psi$ that preferably maximizes the ratio $|\Psi^t \Sigma_b \Psi| / |\Psi^t \Sigma_\omega \Psi|$. This ratio may be maximized when $\Psi$ consists of the eigenvectors of the matrix $$\sum_\omega^{-1}\sum_b:$$

$$\sum_\omega^{-1}\sum_b \Psi = \Psi\Delta \qquad (12)$$

where $\Psi, \Delta \in \mathbb{R}^{m \times m}$ are the eigenvector and eigenvalue matrices of $$\sum_\omega^{-1}\sum_b.$$

The Enhanced FLD Model (EMF) may improve the generalization capability of FLD by decomposing the FLD procedure into a simultaneous diagonalization of the two within- and between-class covariance matrices. The simultaneous diagonalization is preferably a step-wisely equivalent to two operations: whitening the within-class covariance matrix and applying PCA on the between-class covariance matrix using the transformed data. The stepwise operation shows that during whitening the eigenvalues of the within-class covariance matrix appear in the denominator. As the small (trailing) eigenvalues tend to capture noise, they may cause the whitening step to fit for misleading variations and thus generalize poorly when exposed to new data. To achieve enhanced performance, EFM preserves a proper balance between the need that the selected eigenvalues (corresponding to the principal components for the original image space) account for most of the spectral energy of the raw data, i.e., representational adequacy, and the requirement that the eigenvalues of the within-class covariance matrix (in the reduced PCA space) are not too small, i.e., better generalization.

The choice of the range of principal components (m) for dimensionality reduction (see Eq. 9) takes into account both the spectral energy and the magnitude requirements. The eigenvalue spectrum of the covariance matrix (see Eq. 8) supplies a good indicator for meeting the energy criterion; one may then derive the eigenvalue spectrum of the within-class covariance matrix in the reduced PCA space to facilitate the choice of the range of principal components so that the magnitude requirement is met. Towards that end, one may carry out the stepwise FLD process described earlier. In particular, the stepwise FLD procedure may derive the eigenvalues and eigen-vectors of $$\sum_\omega^{-1}\sum_b$$

as the result of the simultaneous diagonalization of $\Sigma_\omega$ and $\Sigma_b$. First whiten the within-class covariance matrix:

$$\Sigma_\omega \Xi = \Xi\Gamma \text{ and } \Xi^t\Xi = I \qquad (13)$$

$$\Gamma^{-1/2}\Xi^t\Sigma_\omega\Xi\Gamma^{-1/2} = I \qquad (14)$$

where $\Xi, \Gamma \in \mathbb{R}^{m \times m}$ are the eigenvector and the diagonal eigenvalue matrices of $\Sigma_\omega$.

The eigenvalue spectrum of the within-class covariance matrix in the reduced PCA space may be derived by Eq. 13, and different spectra obtained corresponding to different number of principal components utilized (see Eq. 9 and Eq. 10). Now one may simultaneously optimize the behavior of the trailing eigenvalues in the reduced PCA space (Eq. 13) with the energy criteria for the original image space (Eq. 8).

After the feature vector $y^{(\mathcal{P})}$ (Eq. 9) is derived, EFM may first diagonalize the within-class co-variance matrix $\Sigma_\omega$ using Eq. 13 and 14. Note that now $\Xi$ and $\Gamma$ are the eigenvector and the eigenvalue matrices corresponding to the feature vector $y^{(\mathcal{P})}$. EFM proceeds then to compute the between-class covariance matrix as follows:

$$\Gamma^{-1/2}\Xi^t\Sigma_b\Xi\Gamma^{-1/2} = K_b \qquad (15)$$

Diagonalize now the new between-class covariance matrix $K_b$:

$$K_b\Theta = \Theta\Delta \text{ and } \Theta^t\Theta = I \qquad (16)$$

where $\Theta, \Delta \in \mathbb{R}^{m \times m}$ are the eigenvector and the diagonal eigenvalue matrices of $K_b$.

The overall transformation matrix of EFM may now defined as follows:

$$T = \Xi\Gamma^{-1/2}\Theta \qquad (17)$$

The Gabor Feature Classifier (GFC) may apply the EFM method on the (lower dimensional) augmented Gabor feature vector $y^{(\mathcal{P})}$ derived by Eq. 9. When an image is presented to the GFC classifier, the augmented Gabor feature vector of the image may first be calculated, and the lower dimensional feature, $y^{(\mathcal{P})}$ derived using Eq. 9. The EFM may then determine the dimensionality of the lower dimensional feature space and derive the overall transformation matrix, T, as defined by Eq. 17. The new feature vector, $U^{(\mathcal{P})}$, of the image may be defined as follows:

$$U^{(\mathcal{P})} = T^t y^{(\mathcal{P})} \qquad (18)$$

Let $M_k^0$, k=1, 2, ..., L, be the mean of the training samples for class $\omega_k$ after the EFM transformation. The GFC may then exploit a nearest neighbor (to the mean) classification rule using some similarity measure $\delta$:

$$\delta_{\cos}(x, y) = \frac{-x^t y}{\|x\|\|y\|} \qquad (23)$$

The image feature vector, $U^{(\mathcal{P})}$, may be classified as belonging to the class of the closest mean, $M_k^0$, using the similarity measure $\delta$.

The similarity measures used in experiments to evaluate the efficiency of different representation and recognition methods include $L_1$ distance measure $\delta_{L_1}$, $L_2$ distance measure $\delta_{L_2}$, Mahalanobis distance measure, $\delta_{Md}$, and cosine similarity measure, $\delta_{cos}$, which may be defined as follows:

$$\delta(U^{(\mathcal{P})}, M_k^0) = \min_j \delta(U^{(\mathcal{P})}, M_j^0) \to U^{(\mathcal{P})} \in \omega_k \qquad (19)$$

$$\delta_{L_2}(x, y) = (x-y)^t(x-y) \qquad (21)$$

$$\delta_{Md}(x, y) = (x-y)^t \Sigma^{-1}(x-y) \qquad (22)$$

$$\delta_{L_1}(x, y) = \sum_i |x_i - y_i| \qquad (20)$$

where $\Sigma$ is the covariance matrix, and $\|\cdot\|$ denotes the norm operator.

Referring to the figures, example embodiments and aspects of the invention are further described. FIG. 1 is a block diagram showing a system for determining similarity between an image and at least one training sample 102 as per an embodiment of the present invention. An image 102 may include an unknown image or a training sample. The image may be a facial image. It may be desired that the unknown image be matched to at least one of the training samples based on similarity of salient features such as facial features. The image 102 may be preprocessed by an image preprocessor 104 capable of generating a preprocessed image 208 from the image 102. An augmented Gabor feature vector calculator 106 may then generate a augmented Gabor feature vector 360 from the preprocessed image 208. Next, a lower dimensional feature vector deriver 108 may derive a lower dimensional feature vector 440 from the augmented Gabor feature vector. Subsequently, a lower dimensional feature space processor 110 may create a discriminated lower dimensional feature space vector 540 by process the lower dimensional feature vector 440 with a lower dimensional feature space discriminator. An overall transformation matrix deriver 112 may then derive an overall transformation matrix 660 from the discriminated lower dimensional feature vector 540. An image feature vector calculator 114 may then calculate an image feature vector using the overall transformation matrix 660. The image feature vector calculator 114 may be capable of taking the product of the overall transformation matrix and the lower dimensional feature vector. Finally, a similarity measure calculator 116 preferably determines a similarity measure for the image and at least one training sample 102.

The similarity measure calculator 116 may be capable of: iteratively for at least one class of the at least one training sample: calculating a training sample class mean value; selecting the class of the closest mean value for the image; and then calculating the similarity measure from the training sample class mean values and the class of the closest mean values. The similarity measure calculator may also calculate the similarity measure using at least one similarity measure. The similarity measure may be any similarity measure including but not limited to: a first distance measure; a second distance measure; a Mahalanobis distance measure; or a cosine similarity measure.

The system may also include an image matcher capable of determining if the image and the at least one training sample match by further determining if the similarity measure is within a predetermined similarity range.

Figure 2:
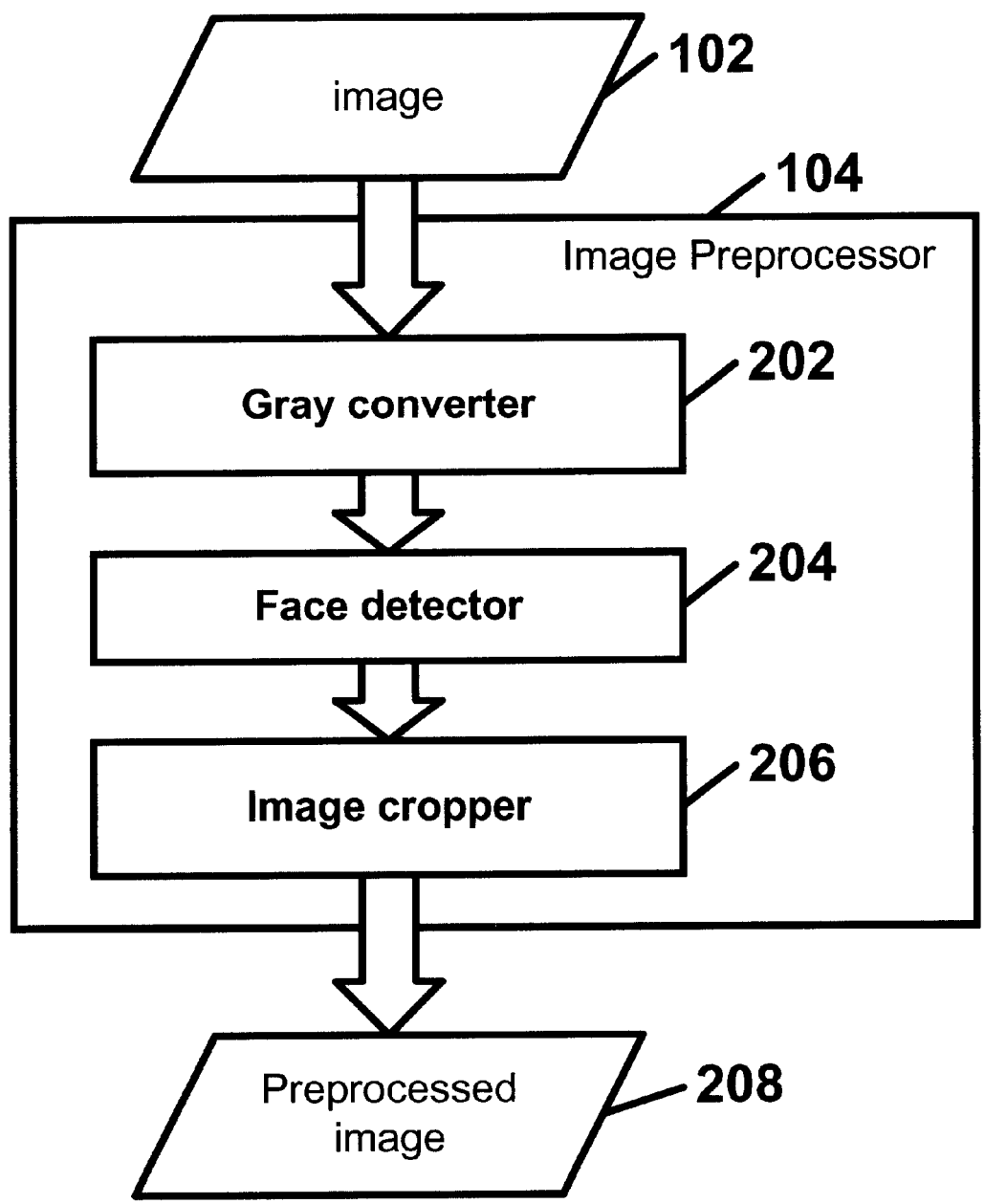
FIG. 2 is a block diagram showing an image preprocessor as per an aspect of an embodiment of the present invention.

FIG. 2 is a block diagram showing an image preprocessor 104 as per an aspect of an embodiment of the present invention. The image preprocessor 104 may include any type of image preprocessing device such as a gray converter 202, a face detector 204, an image cropper 206, or a contrast adjuster. A gray converter 202 is preferably capable of converting non-gray images to a gray scale image. A face detector may detect the location of a face in an image. An image cropper preferably crops out unnecessary image information from an image before continued image processing occurs. Likewise, a contrast adjuster may make adjustments to the contrast of the image to enhance future processing results.

Figure 3:
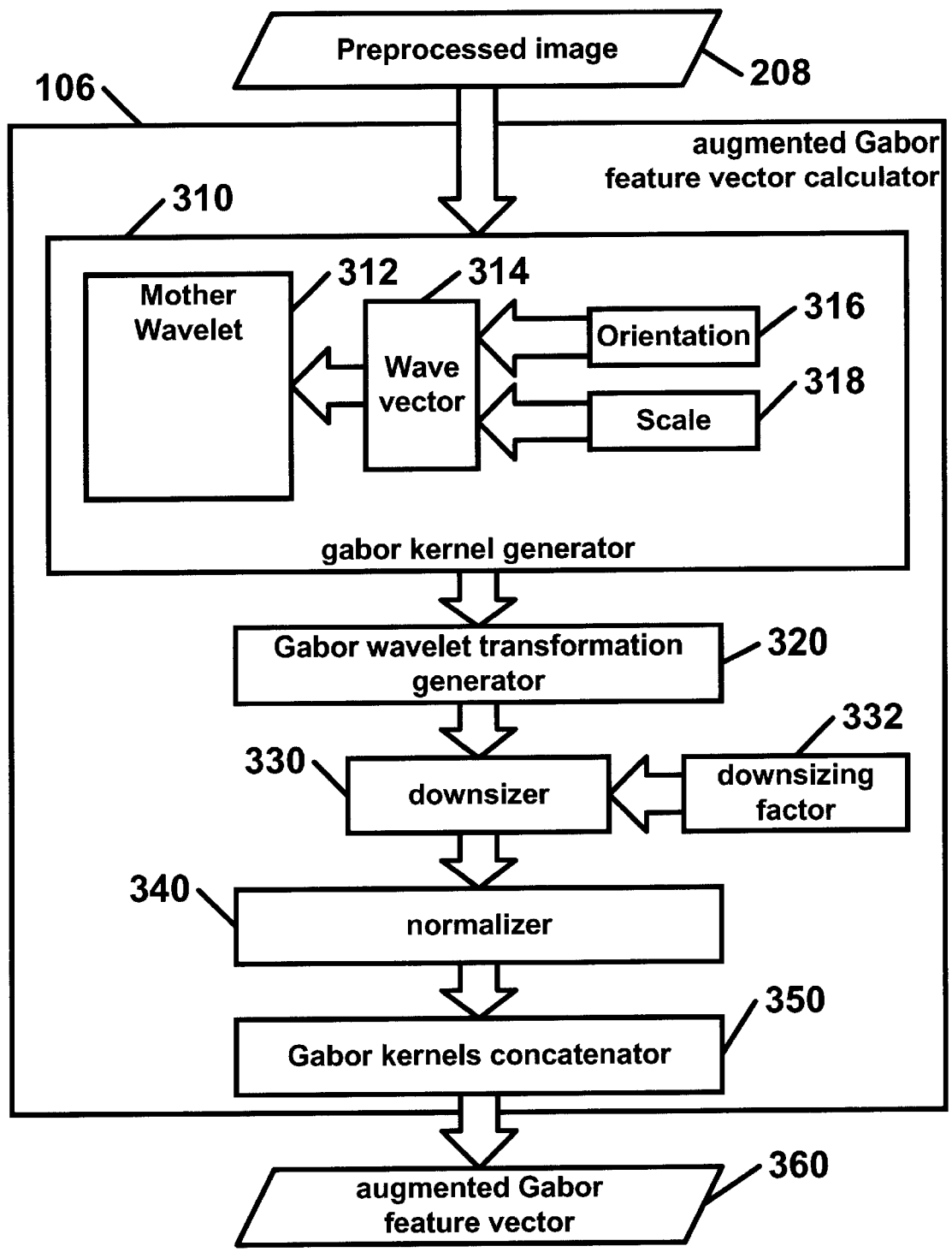
FIG. 3 is a block diagram showing an augmented Gabor feature vector calculator as per an aspect of an embodiment of the present invention.

FIG. 3 is a block diagram showing an augmented Gabor feature vector calculator 106 as per an aspect of an embodiment of the present invention. The augmented Gabor feature vector calculator 106 further includes: a Gabor kernel creator 310 capable of creating a family of Gabor kernels. The family of Gabor kernels preferably consists on a multitude of Gabor Kernels, each generated from a preprocessed image using varying scales and orientations. The Gabor kernel creator 310 preferably calculates each Gabor kernel from the preprocessed image 208 using a mother wavelet 312. The mother wavelet 312 may be controlled by a wave vector 314. The wave vector 314 may use an orientation value and an scale value. The orientation value may be generated by an orientation selector 316 and the scale value may be generated by scale selector 318. The wave vector may also use other parameters such as a delta frequency parameter; a maximum frequency parameter; and a DC offset parameter.

The augmented Gabor feature vector calculator 106 may also include a Gabor wavelet transformation generator 320 and a Gabor kernels concatenator 350. The Gabor wavelet transformation generator 320 may generate a Gabor wavelet transformation by performing a convolution of the preprocessed image with the family of Gabor kernels. The Gabor kernels concatenator 350 may concatenate the family of Gabor kernels.

The augmented Gabor feature vector calculator 106 may also include a downsizer 330 capable of downsizing the family of Gabor kernels by a downsizing factor 332. Also included in the augmented Gabor feature vector calculator 106 is a normalizer 340 capable of normalizing the family of Gabor kernels. The normalizer 340 may normalize the family of Gabor kernels to a zero mean and unit variance.

Figure 4:
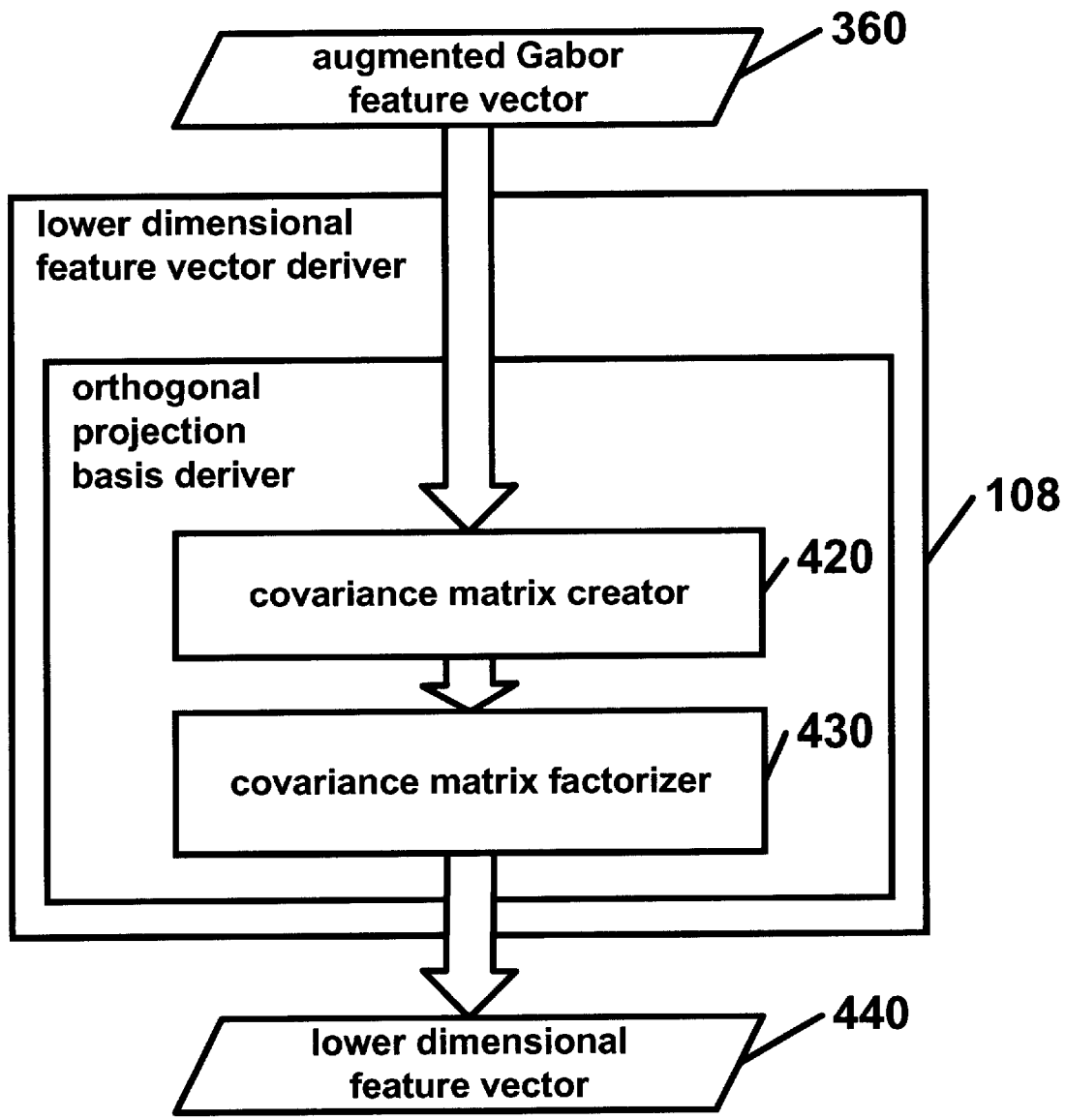
FIG. 4 is a block diagram showing a lower dimensional feature vector deriver as per an aspect of an embodiment of the present invention.

FIG. 4 is a block diagram showing a lower dimensional feature vector deriver 108 as per an aspect of an embodiment of the present invention. The lower dimensional feature vector deriver 108 may include an orthogonal projection basis deriver capable of deriving an orthogonal projection basis including: a covariance matrix creator 420, and a covariance matrix factorizer 430. The covariance matrix creator 420 is preferably capable of creating a covariance matrix from the augmented Gabor feature vector and an expectation operator. The covariance matrix factorizer 430 is preferably capable of factorizing the covariance matrix into an orthogonal eigenvector matrix and a diagonal eigenvalue matrix.

Figure 5:
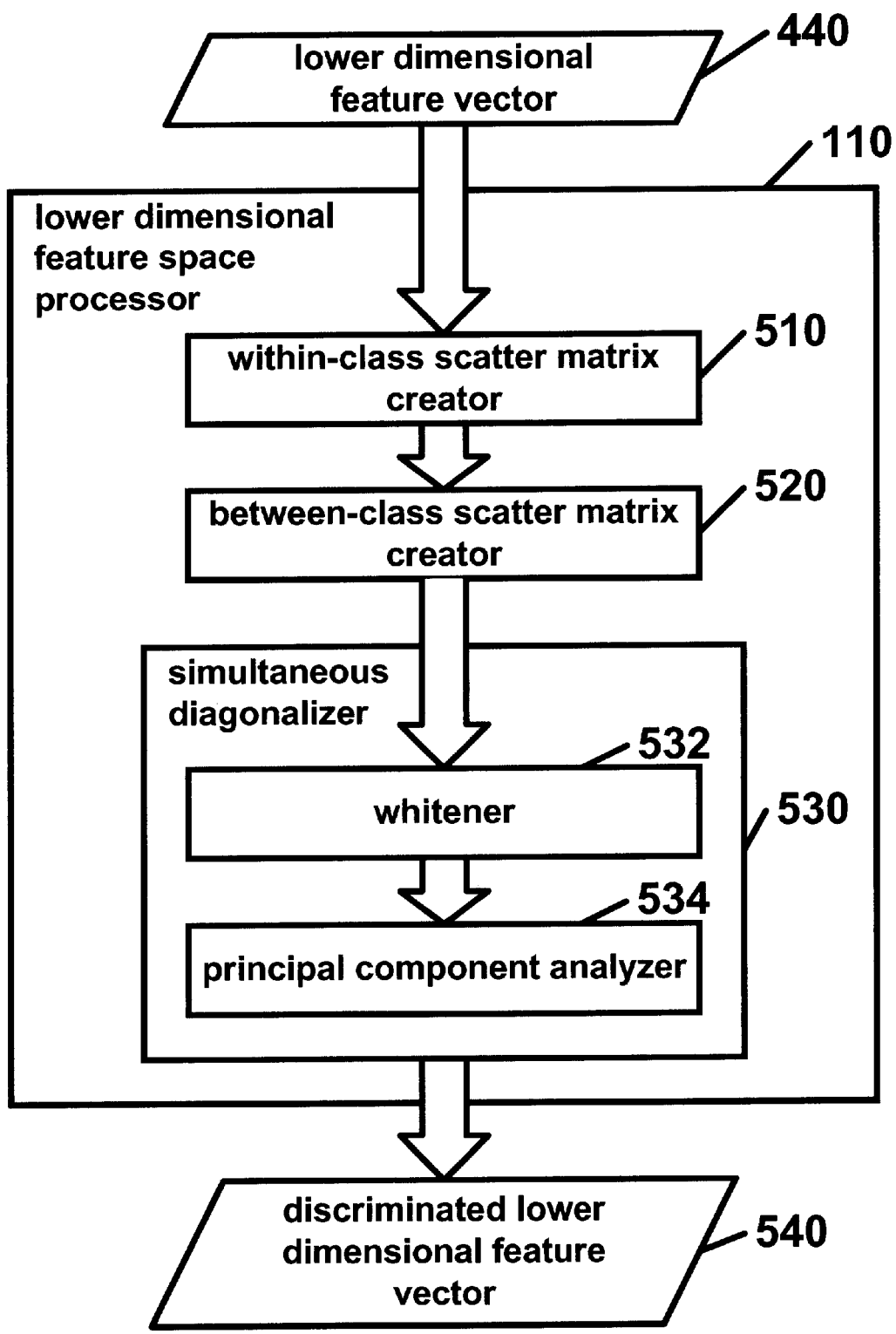
FIG. 5 is a block diagram showing a lower dimensional feature space processor as per an aspect of an embodiment of the present invention.

FIG. 5 is a block diagram showing a lower dimensional feature space processor 110 as per an aspect of an embodiment of the present invention. The lower dimensional feature space processor 110 may further include a within-class scatter matrix creator 510 capable of creating a within-class scatter matrix from the lower dimensional vector; a between-class scatter matrix creator 520 capable of creating a between-class scatter matrix from the lower dimensional vector; and a simultaneous diagonalizer 530 capable of simultaneously diagonalizing the within-class scatter matrix and the between-class scatter matrix. The simultaneous diagonalizer will preferably include: a whitener 532 capable of whitening the within-class scatter matrix; and a principal component analyzer 534 capable of applying principal component analysis to the between-class scatter matrix.

Figure 6:
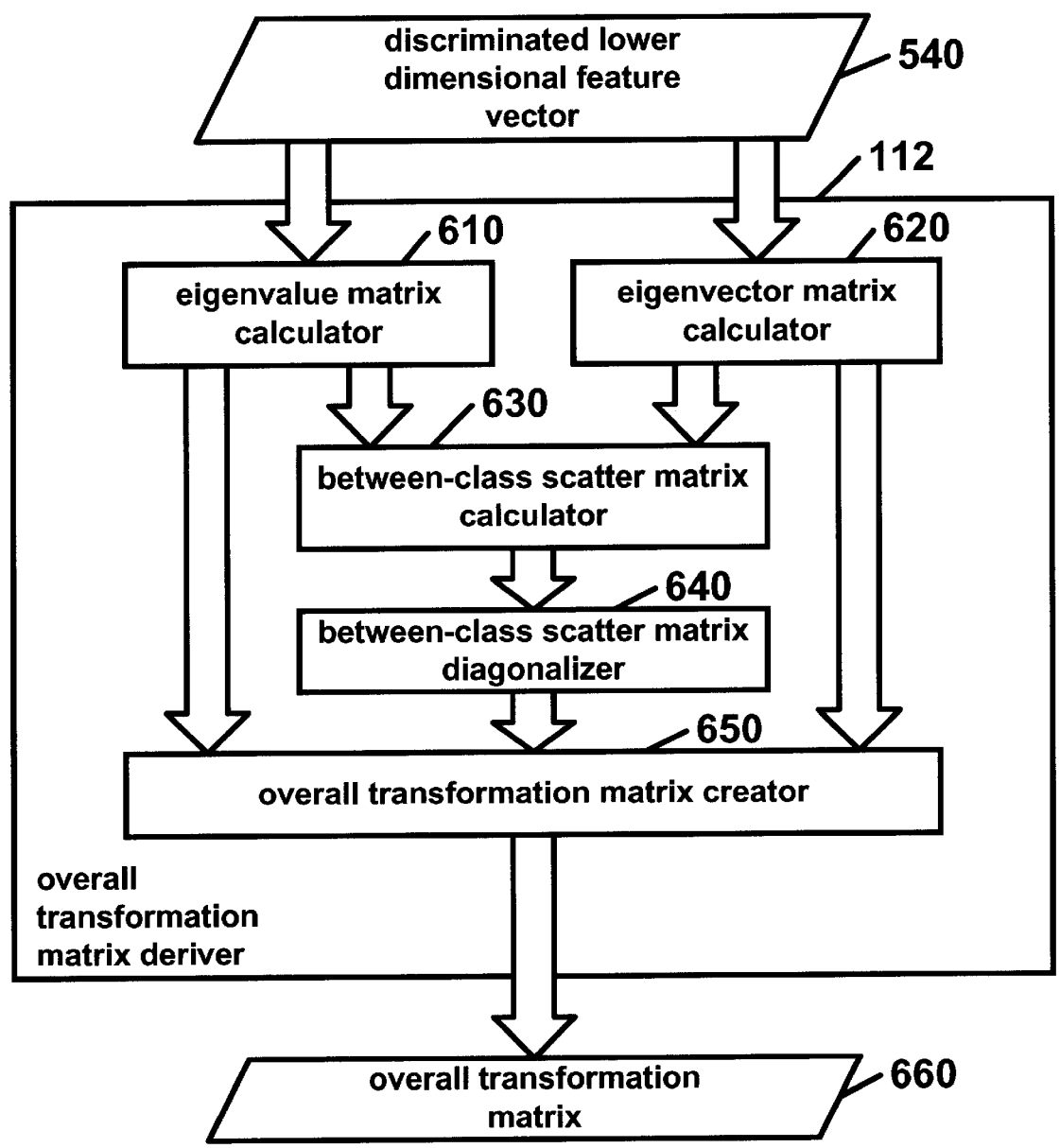
FIG. 6 is a block diagram showing an overall transformation matrix deriver as per an aspect of an embodiment of the present invention.

FIG. 6 is a block diagram showing an overall transformation matrix deriver 112 as per an aspect of an embodiment of the present invention. The overall transformation matrix deriver 112 may include: an eigenvector matrix calculator 610; an eigenvalue matrix calculator 620; a between-class scatter matrix calculator 630; a between-class scatter matrix diagonalizer 640; and an overall transformation matrix creator 650. The eigenvector matrix calculator 610 is preferably capable of calculating an eigenvector matrix corresponding to the discriminated lower dimensional feature vector 540. The eigenvalue matrix calculator 620 is preferably capable of calculating an eigenvalue matrix corresponding to the discriminated lower dimensional feature vector 540. The between-class scatter matrix calculator 630 is preferably capable of computing a between-class scatter matrix using the eigenvector matrix and the eigenvalue matrix. The between-class scatter matrix diagonalizer 640 is preferably capable creating a diagnonalized between-class scatter matrix by diagonalizing the between-class scatter matrix. The overall transformation matrix creator 650 is preferably capable of creating the overall transformation matrix from the eigenvector matrix, the eigenvalue matrix, and the diagnonalized between-class scatter matrix.

Figure 7:
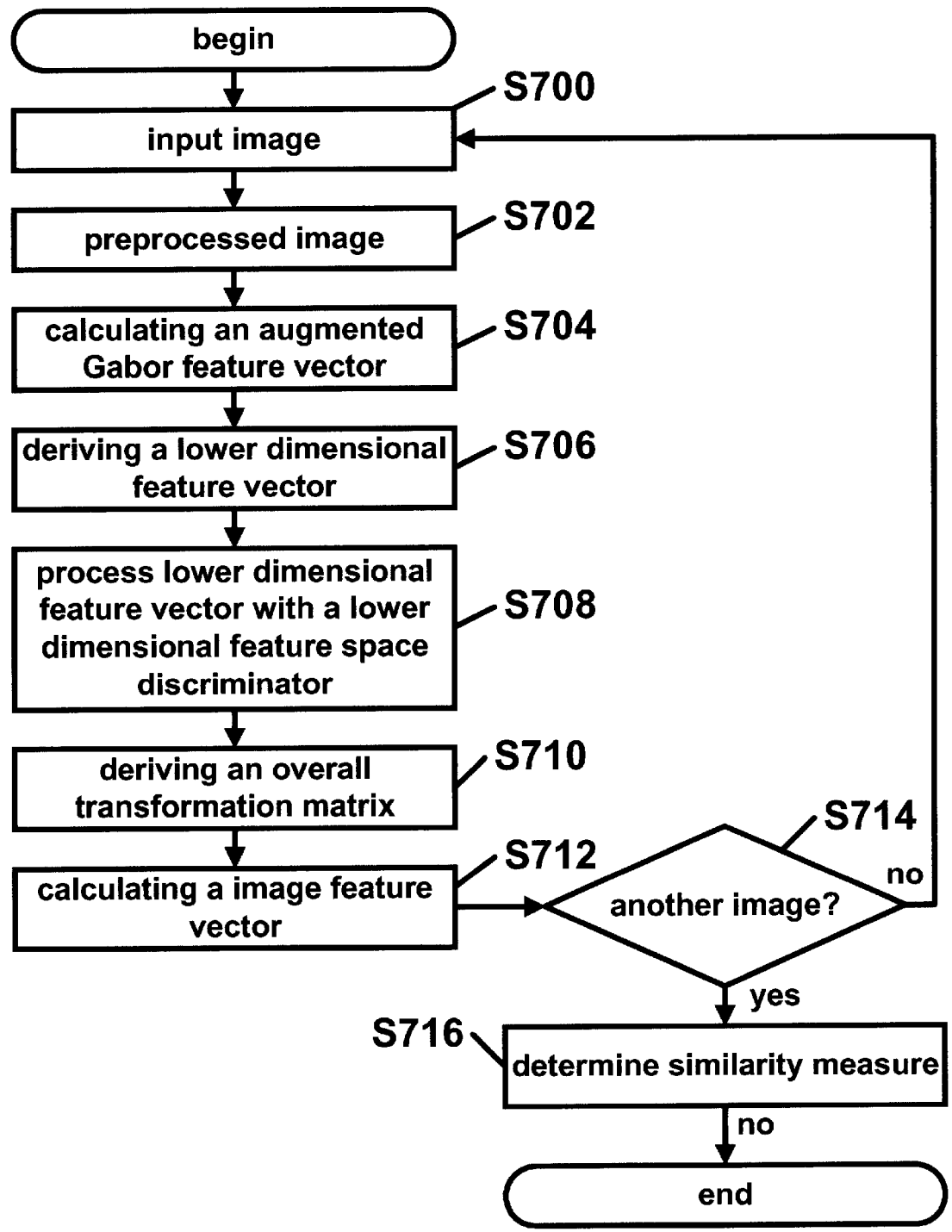
FIG. 7 is a flow diagram showing a method for determining similarity between an image and at least one training sample as per an embodiment of the present invention.

The method of example embodiments of the present invention will now be described. FIG. 7 is a flow diagram showing a method for determining similarity between an image and at least one training sample as per an embodiment of the present invention. The method comprises the steps of: iteratively for the image and each of the training sample(s) (S714): generating a preprocessed image (S702); calculating an augmented Gabor feature vector from the preprocessed image (S704); deriving a lower dimensional feature vector from the augmented Gabor feature vector (S706); processing the lower dimensional feature vector with a lower dimensional feature space discriminator (S708); deriving an overall transformation matrix from the lower dimensional feature vector and the lower dimensional feature space discriminator (S710); and calculating an image feature vector (S712); and determining a similarity measure for the image and the at least one training sample (S716). The image and training samples may be any image including a facial image. The step of preprocessing the image (S702) may include converting the image to a gray scale image.

The step of calculating the image feature vector (S712) may also include the step of taking the product of the overall transformation matrix and the lower dimensional feature vector.

The similarity measure may be calculated from any reasonable similarity measure such as: a first distance measure; a second distance measure; a Mahalanobis distance measure; or a cosine similarity measure. Further, the step of determining if the image and the at least one training sample match may include the step of determining if the similarity measure is within a predetermined similarity range.

Figure 8:
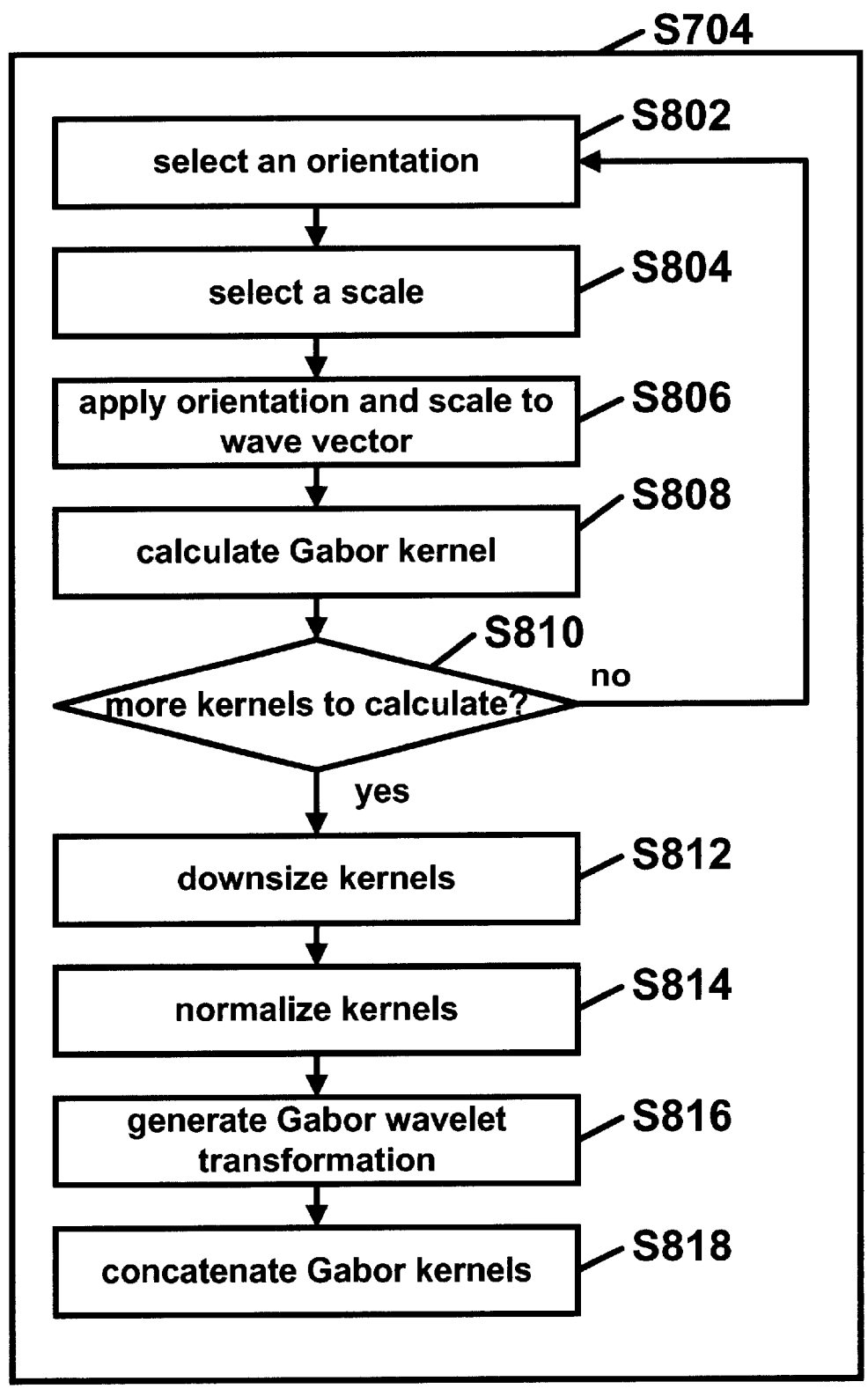
FIG. 8 is a flow diagram showing a method of calculating an augmented Gabor feature vector as per an aspect of an embodiment of the present invention.

FIG. 8 is a flow diagram showing a method of calculating an augmented Gabor feature vector as per an aspect of an embodiment of the present invention. The step of calculating the augmented Gabor feature vector (S704) may comprise the steps of: creating a family of Gabor kernels by iteratively (S810): selecting an orientation (S802); selecting a scale (S804); applying the selected orientation and the selected scale to a wave vector (S806); and calculating a Gabor kernel from the image using a mother wavelet, the mother wavelet controlled by the wave vector (S808); generating a Gabor wavelet transformation by performing a convolution of the preprocessed image with the family of Gabor kernels (S816); and concatenating the family of Gabor kernels (S818).

This step of calculating the augmented Gabor feature vector (S704) may also further include the step of downsizing the family of Gabor kernels by a downsizing factor (S812). Also included may be a step of normalizing the family of Gabor kernels (S814). The step of normalizing the family of Gabor kernels (S814) may involve normalizing the family of Gabor kernels to a zero mean and unit variance.

The wave vector may utilize other parameters including: a delta frequency parameter; a maximum frequency parameter; and a DC offset parameter.

Figure 9:
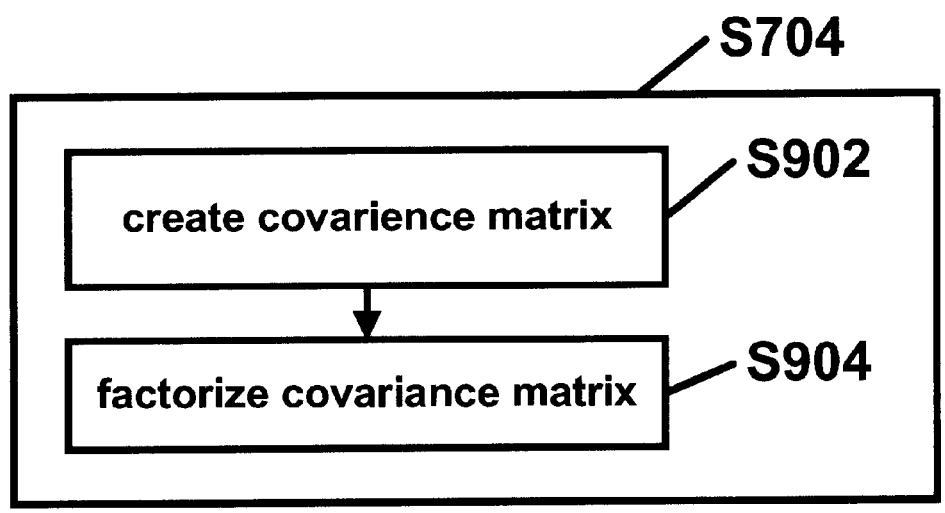
FIG. 9 is a flow diagram showing a method of deriving a lower dimensional feature vector from an augmented Gabor feature vector as per an aspect of an embodiment of the present invention.

FIG. 9 is a flow diagram showing a method of deriving a lower dimensional feature vector from an augmented Gabor feature vector (S706) as per an aspect of an embodiment of the present invention. As shown in this example, the step of deriving the lower dimensional feature vector from the augmented Gabor feature vector (S706) includes the step of deriving an orthogonal projection basis. This orthogonal basis may be derived by creating a covariance matrix from the augmented Gabor feature vector and an expectation operator (S902) and factorizing the covariance matrix into an orthogonal eigenvector matrix and a diagonal eigenvalue matrix (S904).

Figure 10:
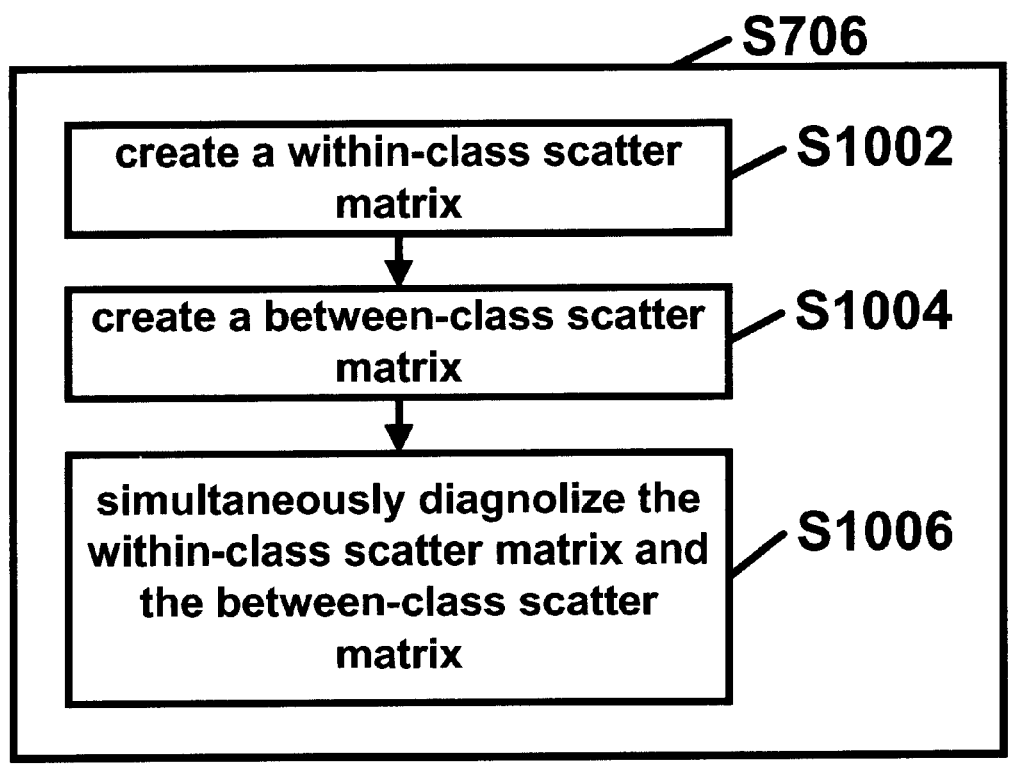
FIG. 10 is a flow diagram showing a method of processing a lower dimensional feature vector with a lower dimensional feature space discriminator as per an aspect of an embodiment of the present invention.

FIG. 10 is a flow diagram showing a method of processing a lower dimensional feature vector with a lower dimensional feature space discriminator (S708) as per an aspect of an embodiment of the present invention. The step of processing the lower dimensional feature vector with a lower dimensional feature space discriminator (S708) may include the steps of: creating a within-class scatter matrix from the lower dimensional vector (S1002); creating a between-class scatter matrix from the lower dimensional vector (S1004); and simultaneously diagonalizing the within-class scatter matrix and the between-class scatter matrix (S1006).

Figure 11:
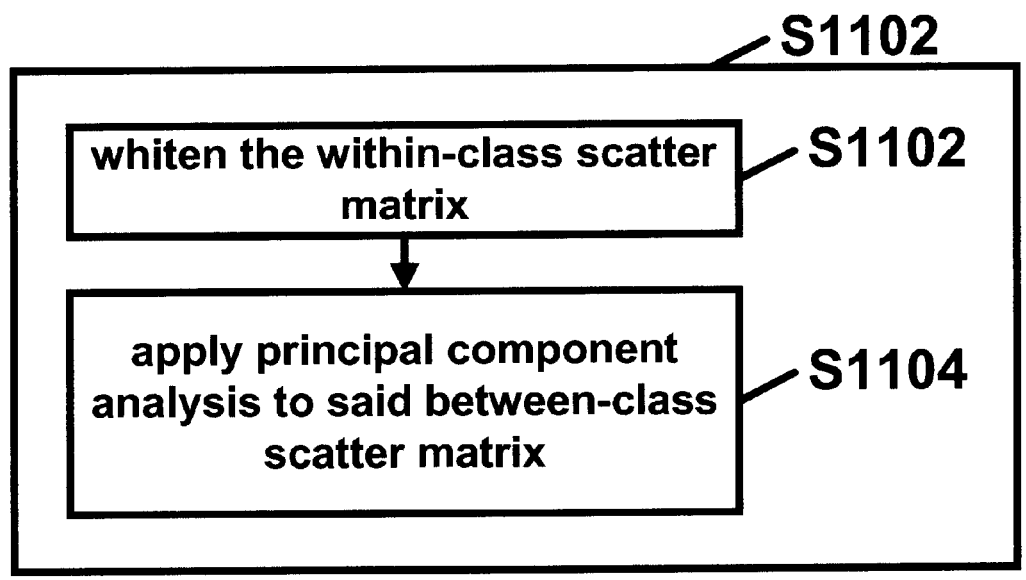
FIG. 11 is a flow diagram showing a method of simultaneously diagonalizing a within-class scatter matrix and a between-class scatter matrix as per an aspect of an embodiment of the present invention.

FIG. 11 is a flow diagram showing a method of simultaneously diagonalizing a within-class scatter matrix and a between-class scatter matrix (S1102) as per an aspect of an embodiment of the present invention. This method of simultaneously diagonalizing the within-class scatter matrix and the between-class scatter matrix (S1102) as shown, may include the steps of: whitening the within-class scatter matrix; and applying principal component analysis to the between-class scatter matrix (S1104).

Figure 12:
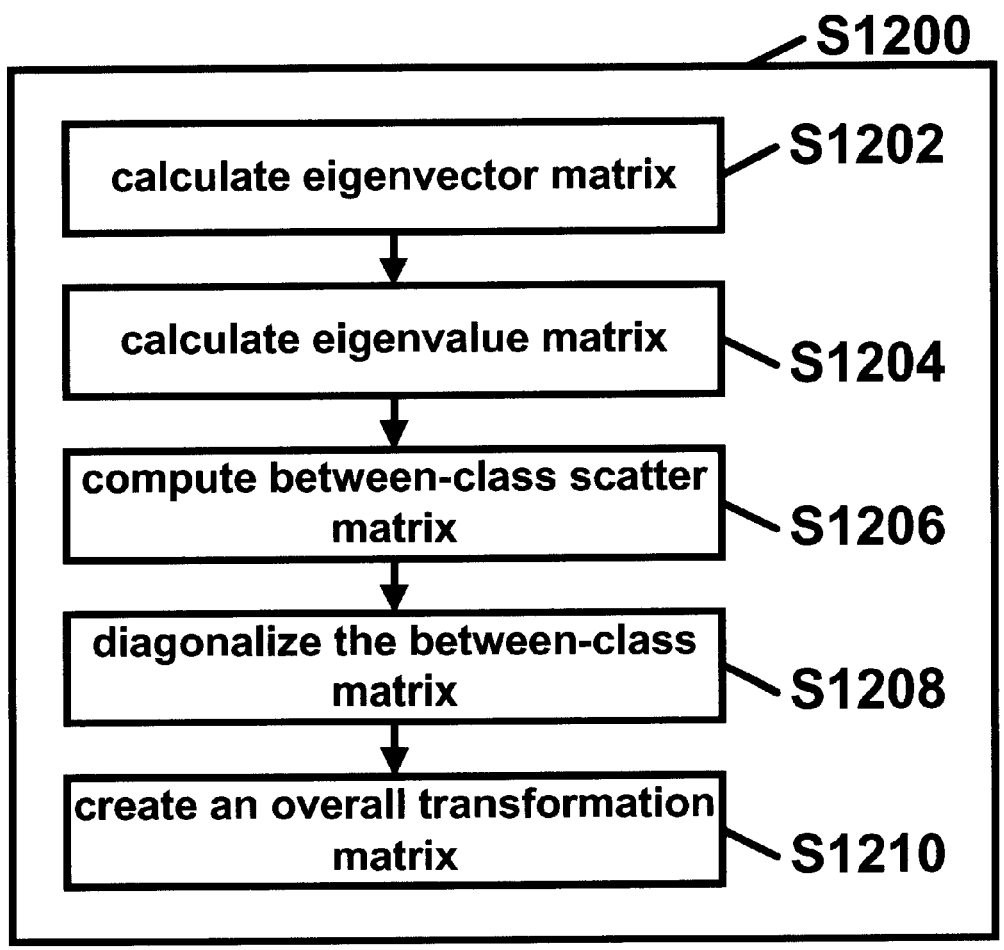
FIG. 12 is a flow diagram showing a method of deriving the overall transformation matrix as per an aspect of an embodiment of the present invention.

FIG. 12 is a flow diagram showing a method of deriving the overall transformation matrix (S710) as per an aspect of an embodiment of the present invention. This step of deriving the overall transformation matrix (S710) preferably includes the steps of: calculating an eigenvector matrix corresponding to the lower dimensional feature vector (S1202); calculating an eigenvalue matrix corresponding to the lower dimensional feature vector (S1204); computing a between-class scatter matrix using the eigenvector matrix and the eigenvalue matrix (S1206); diagonalizing the between-class scatter matrix (S1208); and creating the overall transformation matrix from the eigenvector matrix, the eigenvalue matrix, and the between-class scatter matrix (S1210).

Figure 13:
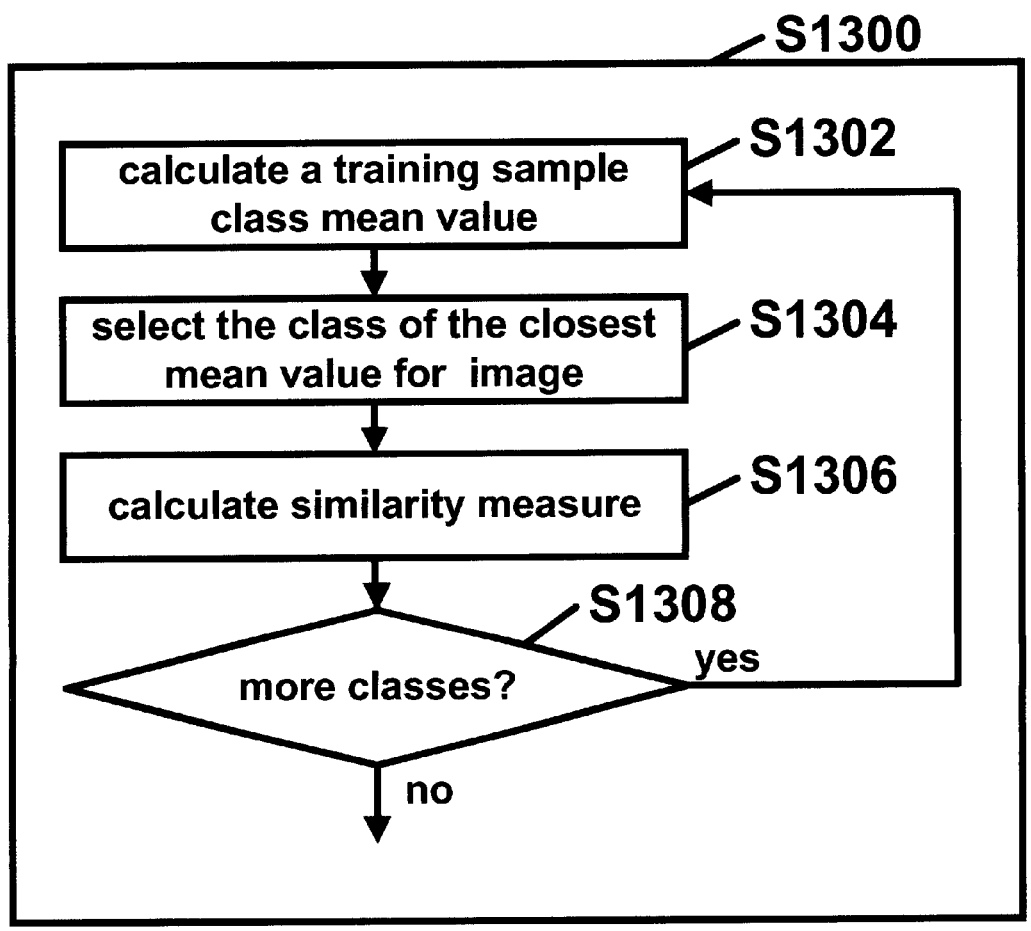
FIG. 13 is a flow diagram showing a method of determining the similarity measure for the image and the at least one training sample as per an aspect of an embodiment of the present invention.

FIG. 13 is a flow diagram showing a method of determining the similarity measure for the image and the at least one training sample (S716) as per an aspect of an embodiment of the present invention. This step of determining the similarity measure for the image and the at least one training sample (S716) may include the steps of: iteratively for at least one class of the at least one training sample (S1308): calculating a training sample class mean value (S1302); and selecting the class of the closest mean value for the image (S1304); and calculating the similarity measure from the training sample class mean values and the class of the closest mean values (S1306).

The disclosed invention is a novel Gabor Feature Classifier (GFC). A principal application of which may be for face recognition. The GFC applies the Enhanced FLD Model (EFM) to an augmented Gabor feature vector derived from the Gabor wavelet transformation of images. The Gabor transformed images exhibit strong characteristics of spatial locality, scale and orientation selectivity corresponding to those displayed by the Gabor wavelets. Such characteristics produce salient local features. For example, when the images are facial images, salient features such as the eyes, nose and mouth, that are suitable for face recognition appear. The feasibility of this invention has been successfully tested on face recognition using 600 FERET frontal face images corresponding to 200 subjects whose facial expressions and lighting conditions may vary.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention could also be used to match non-facial images such as natural images.

What is claimed is:

1. A method for determining similarity between an image and at least one training sample, comprising the steps of:
  a. iteratively for said image and each of said at least one training sample:
    i. generating a preprocessed image;
    ii. calculating an augmented Gabor feature vector from said preprocessed image;
    iii. deriving a lower dimensional feature vector from said augmented Gabor feature vector;
    iv. processing said lower dimensional feature vector with a lower dimensional feature space discriminator;
    v. deriving an overall transformation matrix from said lower dimensional feature vector and said lower dimensional feature space discriminator; and
    vi. calculating a image feature vector; and
  b. determining a similarity measure for said image and said at least one training sample.

2. A method according to claim 1, wherein said image is a facial image.

3. A method according to claim 1, wherein said step of preprocessing said image includes converting said image to a gray scale image.

4. A method according to claim 1, wherein said step of calculating said augmented Gabor feature vector further comprises the steps of:
  a. creating a family of Gabor kernels by iteratively:
    i. selecting an orientation;
    ii. selecting a scale;
    iii. applying said selected orientation and said selected scale to a wave vector; and
    iv. calculating a Gabor kernel from said image using a mother wavelet, said mother wavelet controlled by said wave vector;
  b. generating a Gabor wavelet transformation by performing a convolution of said preprocessed image with said family of Gabor kernels; and
  c. concatenating said family of Gabor kernels.

5. A method according to claim 4, further including the step of downsizing said family of Gabor kernels by a downsizing factor.

6. A method according to claim 4, further including the step of normalizing said family of Gabor kernels.

7. A method according to claim 6, wherein said step of normalizing said family of Gabor kernels, includes normalizing said family of Gabor kernels to a zero mean and unit variance.

8. A method according to claim 4, wherein said wave vector has at least one parameter selected from the group consisting of:
  a. a delta frequency parameter;
  b. a maximum frequency parameter; and
  c. a DC offset parameter.

9. A method according to claim 1, wherein said step of deriving said lower dimensional feature vector from said augmented Gabor feature vector includes the step of deriving an orthogonal projection basis by:
  a. creating a covariance matrix from said augmented Gabor feature vector and an expectation operator; and
  b. factorizing said covariance matrix into an orthogonal eigenvector matrix and a diagonal eigenvalue matrix.

10. A method according to claim 1, wherein said step of processing said lower dimensional feature vector with a lower dimensional feature space discriminator includes the steps of:
  a. creating a within-class scatter matrix from said lower dimensional vector;
  b. creating a between-class scatter matrix from said lower dimensional vector; and
  c. simultaneously diagonalizing said within-class scatter matrix and said between-class scatter matrix.

11. A method according to claim 10, wherein said step of simultaneously diagonalizing said within-class scatter matrix and said between-class scatter matrix includes the steps of:
  a. whitening said within-class scatter matrix; and
  b. applying principal component analysis to said between-class scatter matrix.

12. A method according to claim 1, wherein said step of deriving said overall transformation matrix includes the steps of:
  a. calculating an eigenvector matrix corresponding to said lower dimensional feature vector;
  b. calculating an eigenvalue matrix corresponding to said lower dimensional feature vector;
  c. computing a between-class scatter matrix using said eigenvector matrix and said eigenvalue matrix;
  d. diagonalizing said between-class scatter matrix; and
  e. creating said overall transformation matrix from said eigenvector matrix, said eigenvalue matrix, and said between-class scatter matrix.

13. A method according to claim 1, wherein said step of calculating said image feature vector includes the step of taking the product of said overall transformation matrix and said lower dimensional feature vector.

14. A method according to claim 1, wherein said step of determining said similarity measure for said image and said at least one training sample includes the steps of:
  a. iteratively for at least one class of said at least one training sample:
    i. calculating a training sample class mean value; and
    ii. selecting the class of the closest mean value for said image; and
  b. calculating said similarity measure from said training sample class mean values and said class of the closest mean values.

15. A method according to claim 1, wherein said similarity measure is calculated from at least one similarity measure selected from the group consisting of:
  a. a first distance measure;
  b. a second distance measure;
  c. a Mahalanobis distance measure; and
  d. a cosine similarity measure.

16. A method according to claim 1, further including the step of determining if said image and said at least one training sample match by further determining if said similarity measure is within a predetermined similarity range.

17. A system for determining similarity between an image and at least one training sample, comprising:
   i. an image preprocessor capable of generating a preprocessed image from said image;
   ii. an augmented Gabor feature vector calculator capable of generating an augmented Gabor feature vector from said preprocessed image;
   iii. a lower dimensional feature vector deriver capable of deriving a lower dimensional feature vector from said augmented Gabor feature vector;
   iv. a lower dimensional feature space processor capable of creating a discriminated lower dimensional feature space vector by processing said lower dimensional feature vector with a lower dimensional feature space discriminator;
   v. an overall transformation matrix deriver capable of deriving an overall transformation matrix from said discriminated lower dimensional feature vector; and
   vi. an image feature vector calculator capable of calculating a image feature vector; and
b. similarity measure calculator capable of determine a similarity measure for said image and said at least one training sample.

18. A system according to claim 17, wherein said image is a facial image.

19. A system according to claim 17, wherein said image preprocessor is capable of converting said image to a gray scale image.

20. A system according to claim 17, wherein said augmented Gabor feature vector calculator further includes:
   a. a Gabor kernel creator capable of creating a family of Gabor kernels further including:
      i. an orientation selector capable of generating an orientation value;
      ii. a scale selector capable of generating an scale value;
      iii. a wave vector capable of using said orientation value and said scale value; and
      iv. a mother wavelet capable of calculating a Gabor kernel from said preprocessed image using said mother wavelet controlled by said wave vector;
   b. a Gabor wavelet transformation generator capable of generating a Gabor wavelet transformation by performing a convolution of said preprocessed image with said family of Gabor kernels; and
   c. a Gabor kernels concatenator capable of concatenating said family of Gabor kernels.

21. A system according to claim 20, further including a downsizer capable of downsizing said family of Gabor kernels by a downsizing factor.

22. A system according to claim 20, further including a normalizer capable of normalizing said family of Gabor kernels.

23. A system according to claim 22, wherein said normalizer is capable of normalizing said family of Gabor kernels to a zero mean and unit variance.

24. A system according to claim 20, wherein said wave vector has at least one parameter selected from the group consisting of:
   a. a delta frequency parameter;
   b. a maximum frequency parameter; and
   c. a DC offset parameter.

25. A system according to claim 17, wherein said lower dimensional feature vector deriver includes an orthogonal projection basis deriver capable of deriving an orthogonal projection basis including:
   a. a covariance matrix creator capable of creating a covariance matrix from said augmented Gabor feature vector and an expectation operator; and
   b. a covariance matrix factorizer capable of factorizing said covariance matrix into an orthogonal eigenvector matrix and a diagonal eigenvalue matrix.

26. A system according to claim 17, wherein said lower dimensional feature space processor further includes:
   a. a within-class scatter matrix creator capable of creating a within-class scatter matrix from said lower dimensional vector;
   b. a between-class scatter matrix creator capable of creating a between-class scatter matrix from said lower dimensional vector; and
   c. a simultaneous diagonalizer capable of simultaneously diagonalizing said within-class scatter matrix and said between-class scatter matrix.

27. A system according to claim 26, wherein said simultaneous diagonalizer includes:
   a. a whitener capable of whitening said within-class scatter matrix; and
   b. a principal component analyzer capable of applying principal component analysis to said between-class scatter matrix.

28. A system according to claim 20, wherein said overall transformation matrix deriver further includes:
   a. an eigenvector matrix calculator capable of calculating an eigenvector matrix corresponding to said discriminated lower dimensional feature vector;
   b. an eigenvalue matrix calculator capable of calculating an eigenvalue matrix corresponding to said discriminated lower dimensional feature vector;
   c. a between-class scatter matrix calculator capable of computing a between-class scatter matrix using said eigenvector matrix and said eigenvalue matrix;
   d. a between-class scatter matrix diagonalizer capable creating a diagnonalized between-class scatter matrix by diagonalizing said between-class scatter matrix; and
   e. an overall transformation matrix creator capable of creating said overall transformation matrix from said eigenvector matrix, said eigenvalue matrix, and said diagnonalized between-class scatter matrix.

29. A system according to claim 20, wherein said image feature vector calculator is capable of taking the product of said overall transformation matrix and said lower dimensional feature vector.

30. A system according to claim 20, wherein said similarity measure calculator is capable of:
   a. iteratively for at least one class of said at least one training sample:
      i. calculating a training sample class mean value; and
      ii. selecting the class of the closest mean value for said image; and
   b. calculating said similarity measure from said training sample class mean values and said class of the closest mean values.

31. A system according to claim 20, wherein said similarity measure calculator calculates said similarity measure using at least one similarity measure selected from the group consisting of:
  a. a first distance measure;
  b. a second distance measure;
  c. a Mahalanobis distance measure; and
  d. a cosine similarity measure.

32. A system according to claim 20, further including an image matcher capable of determining if said image and said at least one training sample match by further determining if said similarity measure is within a predetermined similarity range.

* * * * *